United States Patent [19]

Darnell et al.

[11] 4,374,110

[45] Feb. 15, 1983

[54] PURIFICATION OF SILICON SOURCE MATERIALS

[75] Inventors: Robert D. Darnell; William M. Ingle, both of Phoenix, Ariz.

[73] Assignee: Motorola, Inc., Schaumburg, Ill.

[21] Appl. No.: 273,519

[22] Filed: Jun. 15, 1981

[51] Int. Cl.³ .......................................... C01B 33/107
[52] U.S. Cl. .................................................... 423/342
[58] Field of Search ........................ 423/341, 342, 348

[56] References Cited

U.S. PATENT DOCUMENTS 3,252,752  5/1966  Pohl .................................... 423/342
3,540,861  11/1970  Bradley et al. ...................... 423/342
3,871,872  3/1975  Downing ............................. 423/348

FOREIGN PATENT DOCUMENTS 38-22262  10/1963  Japan ................................... 423/342

Primary Examiner—Jack Cooper
Attorney, Agent, or Firm—John A. Fisher

[57] ABSTRACT

A process is disclosed for the purification of trichlorosilane and other silicon source materials. Trace impurities of boron and phosphorous are removed from trichlorosilane by reacting small amounts of oxygen with the trichlorosilane at a temperature between about 170° and 300° C. The oxygen reacts with the Si—H bond in $HSiCl_3$ to form a "SiOH" species which in turn complexes impurities such as $BCl_3$ or $PCl_3$ present in the trichlorosilane. Purification of the trichlorosilane is then easily accomplished during a subsequent distillation step which separates the purified trichlorosilane from the less volatile complexed boron or phosphorous compounds.

4 Claims, 2 Drawing Figures

PURIFICATION OF SILICON SOURCE MATERIALS

BACKGROUND OF THE INVENTION

This invention relates in general to a process for purifying silicon source materials and more specifically to a process for removing impurities from trichlorosilane or from mixtures of trichlorosilane and silicon tetrachloride.

Large quantities of polycrystalline silicon are produced by the hydrogen reduction of a silicon bearing reactant gas. For example, in a commonly used process trichlorosilane or mixtures of trichlorosilane with other silicon bearing reactants such as silicon tetrachloride are reduced to deposit polycrystalline silicon on a heated filament. In the semiconductor industry it is required that the polycrystalline silicon be of extremely high purity. This in turn requires that the silicon source gas be of high purity and be free from trace impurities.

Most impurities can be readily removed from trichlorosilane or silicon tetrachloride by conventional distillation techniques. Trace impurities of boron or phosphorous which are usually present in the form of $BCl_3$ or $PCl_3$, however, are not easily removed by distillation. To reduce such contaminants to an acceptably low level by distillation would require several sequential distillation steps. It is desirable to have a purification process which achieves a still higher level of purification, unobtainable by distillation alone, which does not require the time and expense of multiple distillations.

Other processes have been proposed for purifying trichlorosilane. In one process, for example, $BCl_3$ present as an impurity in $HSiCl_3$ is complexed by a hydrolysis process in which water vapor is passed over the surface of the trichlorosilane. The purified $HSiCl_3$ is then separated from the partially hydrolyzed polysiloxane residue by distillation. When this type of purification is carried out in an operating system, however, the system can be quickly clogged up by the copious amounts of solid polysiloxane residue which are formed.

It has also been suggested that elemental boron (or phosphorous) can be removed from $HSiCl_3$ by the addition of iodine or bromine to the $HSiCl_3$. The boron (or phosphosous) reacts with the iodine or bromine to form iodides or bromides which are readily separated from $HSiCl_3$ by distillation. This purification technique, however, is not effective unless the boron (or phosphorous) is in the elemental state. Thus in most applications this technique is ineffective for the removal of boron and phosphorous compounds.

Because of the shortcomings of the prior art processes it has become necessary to develop a novel and improved purification system which will provide the high purity silicon source reactants necessary in the semiconductor industry.

It is therefore an object of this invention to provide an improved process for purifying silicon source materials.

It is another object of this invention to provide an improved process for purifying trichlorosilane.

It is a further object of this invention to provide an improved process for purifying trichlorosilane admixed with other silicon source gases in the recovery loop of a polycrystalline silicon production process.

It is a still further object of this invention to provide an improved process for purifying mixtures of trichlorosilane and silicon tetrachloride.

It is another object of this invention to provide an improved process for removing boron and phosphorous impurities from silicon source gases and liquids.

BRIEF SUMMARY OF THE INVENTION

The foregoing and other objects are achieved in the present invention through the use of a novel purification system employing the partial oxidation of the silicon source gas. In one embodiment of the invention trichlorosilane is purified by reacting trichlorosilane with small quantities of oxygen. The complex formed by this oxidation reaction in turn reacts with $BCl_3$ or $PCl_3$ to form a boron or phosphorous complex which can be removed from the purified trichlorosilane by distillation. Preferably about 0.01 to 0.2 mole percent of oxygen is used in the reaction and the reaction is carried out at a temperature between about 170° and 300° C.

Lower concentrations of oxygen also complex boron and phosphorous compounds, but are less effective. Concentrations of oxygen greater than about 1.0 mole percent consume larger fractions of the $HSiCl_3$ without further enhancing the purification.

DETAILED DESCRIPTION OF PREFERRED EMBODIMENTS

Figure 1:
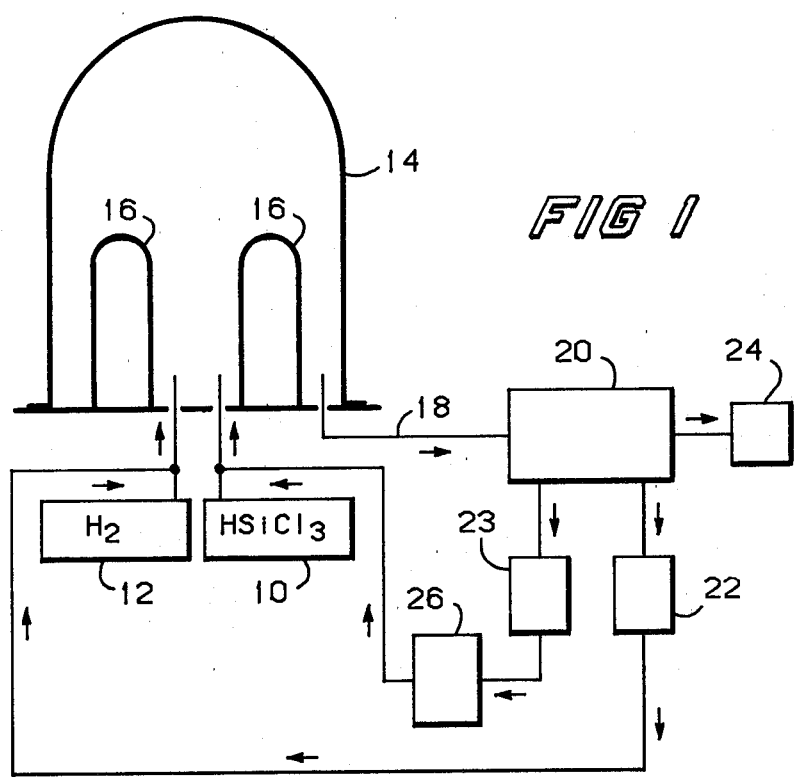
FIG. 1 illustrates the flow and recycling of reactants in a polycrystalline deposition cycle.

The conventional polycrystalline silicon deposition process is illustrated in FIG. 1. Initially trichlorosilane 10 and hydrogen 12 are injected into a reactor bell jar 14. Within the bell jar are heated filaments 16. The hydrogen and trichlorosilane react at the surface of the filaments to deposit polycrystalline silicon. By-products and unreacted trichlorosilane and hydrogen are exhausted from the bell jar at 18. The effluent includes, besides hydrogen and trichlorosilane, hydrogen chloride, silicon tetrachloride, other silicon bearing compounds, and those portions of the impurities which were originally contained in the trichlorosilane and which were not incorporated in the deposited polycrystalline silicon. The effluent is processed at 20 to separate out hydrogen 22, silicon bearing reactants 23, and hydrogen chloride 24. The hydrogen and silicon bearing reactants are recycled as inputs to the silicon deposition process. Makeup amounts of trichlorosilane are added to the silicon bearing effluent.

Before the silicon bearing effluent is returned to the reactor chamber, it is possible to process the effluent through a purification operation indicated schematically at 26. In the past, this purification has been accomplished by one or more distillation steps. While distillation is effective in removing certain impurities, it is relatively inefficient in removing trace amounts of boron.

Trace amounts of boron and phosphorous are typically present in the incoming trichlorosilane. A portion of these impurities is deposited with the polycrystalline silicon as a dopant. The remaining impurities enter the recycling loop and are subsequently returned to the reactor unless removed in some purification step. The amount of impurities in the recycle loop builds up as the process continues. Although the amount of impurities present in the incoming trichlorosilane may be low enough to not have an adverse doping effect of the deposited polycrystalline silicon the amount of impurities resulting from the build up can have such a deleterious effect.

In accordance with the invention, an improved purification step specifically for removing boron and phosphorous from either trichlorosilane or other silicon bearing reactants including mixtures of trichlorosilane and silicon tetrachloride is provided. In the improved process boron or phosphorous impurities are complexed by heating the silicon bearing compound and adding a metered amount of oxygen.

Figure 2:
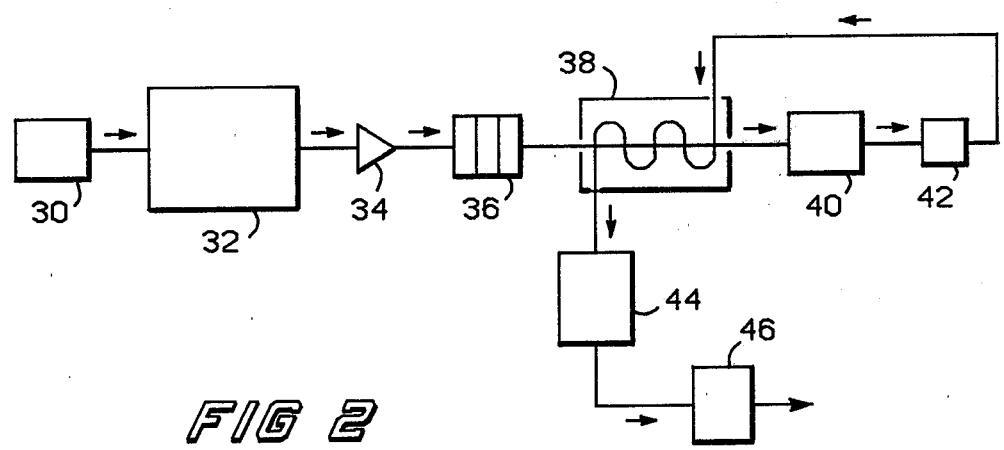
FIG. 2 is a flow diagram illustrating apparatus for purification in accordance with the invention.

Apparatus suitable for carrying out the purification process is illustrated in FIG. 2. A silicon source material 30 enters the purification system and, for convenience and uniformity, flows into a ballast tank 32. The silicon source material is in a gaseous or liquid state and may be, for example, a saturated hydrogen-trichlorosilane gas mixture or the halosilane product stream from a polycrystalline silicon reactor apparatus. The latter is comprised mainly of trichlorosilane and silicon tetrachloride. From the ballast tank the silicon bearing gas passes through a pump 34 and particulate filters 36 to a gas/gas heat exchanger 38 in which the gas stream is initially warmed. After prewarming in the heat exchanger the gas passes through a primary heater 40 where it reaches the desired reaction temperature. After passing through primary heater 40 a carefully controlled amount of oxygen is added at 42. Adding the oxygen to the heated stream of silicon bearing gas results in a chemical reaction (to be described below) which results in the complexing of boron and phosphorous impurites in the gas stream. The heated gas stream then passes again through the heat exchanger where the heat is imparted to the incoming gas stream. The now cooled gas stream is optionally collected in a holding tank 44, and then continues on to a conventional distillation apparatus 46 where the boron and phosphorous complexes are separated from the silicon gas stream. The purified silicon gas stream is then in condition for injection back into the polycrystalline silicon deposition apparatus.

The process in the above described apparatus is monitored by standard gas chromatography mass spectroscopy (GCMS). With the gas heated to a temperature below about 160° C. no reaction is observed between the $O_2$ and the $HSiCl_3$. At higher temperatures the oxidation of $HSiCl_3$ is rapid and consumption of oxygen is complete. No trace of $O_2$ is detected at these higher temperatures by the GCMS. The major trichlorosilane oxidation products are examined; for reaction temperatures between about 170° and 250° C. one small chain species predominates. The resultant oxidation product formed in this temperature range has a molecular weight of m/e=248 which is consistent with the following structure:

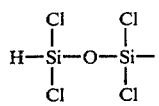

At higher temperatures, higher molecular weight species result consistent with linear and cyclic compounds containing three and four silicon atoms.

It is believed that the oxidative purification of trichlorosilane can be described by the following equations:

$$HSiCl_3 + O_2 \xrightarrow{\geq 170° C.} [HOSiCl_3]\dagger + 0.$$

The intermediate product indicated by the dagger † then reacts with $BCl_3$ as follows:

$$BCl_3 + [HOSiCl_3] \rightarrow Cl_2B-O-SiCl_3 + HCl.$$

Competing with the $BCl_3$ reaction is the following side reaction:

$$HSiCl_3 + [HOSiCl_3]\dagger \rightarrow Cl_3Si-O-SiCl_2H + HCl.$$

The initial step in this process is the formation of a $Cl_3Si$—OH intermediate. The evidence for this type of species is that the final boron reaction product is in the form of B—O—Si species which would originate from a B—Cl species reacting with Si—OH. The driving force in this reaction is the thermodynamically favorable formation of the strong B—O and H—Cl bonds.

It is believed that phosphorous impurities are removed by a similar complexing mechanism. The proposed $[HOSiCl_3]$ † intermediate reacts with $PCl_3$ as follows:

$$PCl_3 + [HOSiCl_3]\dagger \rightarrow Cl_2P-O-SiCl_3 + HCl.$$

At temperatures greater than about 300° C. a more complex reaction occurs and intra and inter species thermally induced polysiloxane rearrangement products are formed. No additional purification is observed at these higher temperatures indicating that the thermal rearrangement products are not reactive with $BCl_3$ or $PCl_3$.

The incorporation of boron or phosphorous into the polysiloxane chain raises the boiling point of the boron or phosphorous containing species considerably. During a subsequent distillation process these higher boiling materials are readily separated from the $HSiCl_3$ yielding $HSiCl_3$ essentially free from the original boron and/or phosphorous contamination.

The initial oxidation of the $HSiCl_3$ and the competing side reaction represent trichorosilane which is sacrificed in the purification process. To optimize the process it is desirable that this loss of trichorosilane be minimized. Under laboratory conditions it has been determined that 1.0 moles of $O_2$ reacts to complex about 0.38 moles of boron under the conditions specified above. The amount of oxygen necessary to purify the silicon source material can thus be adjusted depending on known impurity levels. In general about 0.01 to 0.2 mole percent of oxygen will be adequate to remove boron and phosphorous compounds from the source material without resulting in too severe a loss of the source material itself.

The quantity of $HSiCl_3$ consumed during the purification process is reduced further by diluting the $HSiCl_3$ to be purified with high purity $SiCl_4$. The initial oxidative purification step is identical with or without $SiCl_4$, namely $$HSiCl_3 + O_2 \rightarrow [HOSiCl_3]\dagger + 0.$$

In addition to reacting with $BCl_3$ and $PCl_3$, the $[HOSiCl_3]$ † reacts with $SiCl_4$ as follows:

$$SiCl_4 + [HOSiCl_3] \uparrow \rightarrow Cl_3SiOSiCl_3 + HCl.$$

In purifying mixtures of $HSiCl_3$ and $SiCl_4$, such as the product mixture recovered from the silicon deposition process, by low level oxidation, both the $HSiCl_3$ and $SiCl_4$ are found to be greatly reduced in boron and phosphorous contamination.

The following non-limiting examples will further serve to illustrate preferred embodiments of the invention.

EXAMPLE I

Nitrogen at a flow rate of about 0.2 liters per minute is bubbled through a tank filled with about 3000–3500 grams of $HSiCl_3$. As the nitrogen gas bubbles through the $HSiCl_3$, the nitrogen becomes saturated and forms a $HSiCl_3/N_2$ vapor combination. To test the effectiveness of the purification process this vapor is then intentionally contaminated with known quantities of $BCl_3$. High concentrations (about 1.0% in $HSiCl_3$) of $BCl_3$ are used to facilitate analysis of the purification data. The contamination with $BCl_3$ is accomplished by bubbling nitrogen gas through a tank containing about 500 milliliter $BCl_3$ to form a saturated $BCl_3/N_2$ vapor combination which is then mixed with $HSiCl_3/N_2$ vapor at a selected rate.

To test the effectiveness of various oxygen concentrations and reaction temperatures on the purification process both oxygen concentration and temperature were maintained as variables. Concentration of boron in the $HSiCl_3$ vapor are monitored both before and after the oxidation reaction. Below about 170° C. no reaction is observed between the $O_2$ and the $HSiCl_3$. At temperatures greater than about 170° C. the oxidation of $HSiCl_3$ is rapid and the consumption of the additive oxygen complete.

Specifically, flow rates and pressures are adjusted to deliver $3.6 \times 10^{-2}$ moles/min. of $HSiCl_3$ and $3.6 \times 10^{-4}$ moles/min. of $BCl_3$ in the gas stream. The gas stream is passed through a furnace tube heated to about 180° C. with a residence time of about 20 seconds in the heated tube. The effluent stream is sampled approximately every 15 minutes with GCMS equipped for on-line manual injection.

After calibration of the GCMS against various representative $BCl_3$ flow rates, oxidative purification is initiated. Oxygen is added at a flow rate of $2.0 \times 10^{-4}$ moles/min.; the resulting $BCl_3$ in the effluent stream is measured to be reduced to $2.8 \times 10^{-4}$ moles/min. The oxygen flow rate is increased to $4 \times 10^{-4}$ moles/min. and the $BCl_3$ in the effluent drops further to $2.1 \times 10^{-4}$ moles/min.

The oxidative purification is repeated at temperatures of 200°, 220°, 250°, 300°, 350°, 400°, 450° and 500° C. Reproducible results are obtained for temperatures less than or equal to 300° C. Preferably the process is carried out at about 200° C. Above 300° C. polysiloxane residue is found to build up in the GCMS transfer lines. Also, slightly less complexing of the $BCl_3$ is found to occur at temperatures over about 300° C.

Analysis of the data indicates about 1.0 moles of oxygen reacts with the $HSiCl_3$ to complex about 0.38 moles of $BCl_3$ at temperatures between about 170° C. and about 300° C. Increased mechanical and process problems are encountered at temperatures above about 300° C.

EXAMPLE II

The apparatus as depicted in FIG. 2 is used to purify the effluent from a polycrystalline silicon reactor. The silicon bearing materials comprise about 25 percent trichlorosilane and balance silicon tetrachloride. The boron contaminant level in the mixture of trichlorosilane and silicon tetrachloride is measured to be greater than or equal to about 0.75 ppb (parts per billion). The phosphorous contaminant level in the mixture is measured to be greater than or equal to about 0.65 ppb. The effluent gas is heated to a temperature of about 180° to 220° C. Oxygen at a level of about 0.01 to 0.2 mole $O_2$ per mole $HSiCl_3$ is mixed with the silicon bearing vapor. After the reaction the silicon bearing reactants are distilled to remove higher boiling materials. After the distillation the remaining silicon bearing mixture is analyzed and determined to contain less than 0.10 ppb boron and less than 0.18 ppb phosphorous.

Following each of the above examples the purification apparatus is dismantled and examined. No build-up of oily residues is found, indicating that no long chain molecules are formed during the purification.

Thus it is apparent that there has been provided, in accordance with the invention, a process for purifying silicon source materials which fully meets the objects and advantages set forth above. Boron and phosphorous impurities are effectively removed from silicon source material by controlled oxidation. While the invention has been described in terms of specific embodiments thereof it is not intended that the invention be so limited. Variations and modifications in the purification apparatus and in the application of the invention will of course be apparent to those skilled in the art. For example, those skilled in the art will recognize that in the production of $HSiCl_3$ from either the reaction of HCl and metallurgical grade silicon or from the reaction of $SiCl_4$, metallurgical grade silicon and hydrogen, oxidative purification in accordance with the invention can be applied to simplify the necessary purification process to yield higher purity silicon source materials at a lower cost. Accordingly, it is intended to embrace all such variations and modifications as fall within the scope of the invention.

We claim:

1. A process for removing $BCl_3$ and/or $PCl_3$ impurities from a silicon source material including trichlorosilane which comprises the steps of:
   heating said material in gaseous form to a temperature of about 170° C. to about 300° C. with oxygen to effect formation of boron and/or phosphorous containing siloxane complexes; and
   distilling to remove said siloxane complexes from said source material.

2. The process of claim 1 wherein said temperature is about 200° C.

3. The process of claim 1 wherein said silicon source material comprises trichlorosilane and silicon tetrachloride.

4. The process of claim 3 wherein said oxygen is present in a ratio with trichlorosilane of about 0.01 to 1.0 mole percent.

* * * * *